(12) United States Patent
Zhou et al.

(10) Patent No.: US 7,714,939 B2
(45) Date of Patent: May 11, 2010

(54) RELIABILITY ESTIMATION OF TEMPORAL NOISE ESTIMATION

(75) Inventors: Zhi Zhou, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1436 days.

(21) Appl. No.: 11/100,369

(22) Filed: Apr. 5, 2005

(65) Prior Publication Data

US 2006/0221252 A1    Oct. 5, 2006

(51) Int. Cl.
*H04N 5/14* (2006.01)
*H04N 11/02* (2006.01)

(52) U.S. Cl. .................................. 348/701; 375/240.16

(58) Field of Classification Search ................ 348/700, 348/701, 620, 452; 382/170, 100; 375/240.12, 375/240.03, 240.29, 240.16, 240.24
See application file for complete search history.

(56) References Cited

U.S. PATENT DOCUMENTS

| | | | |
|---|---|---|---|
| 6,285,710 B1 * | 9/2001 | Hurst et al. | 375/240.12 |
| 6,807,231 B1 * | 10/2004 | Wiegand et al. | 375/240.12 |
| 7,236,177 B2 * | 6/2007 | Sih et al. | 345/572 |
| 2002/0064228 A1 * | 5/2002 | Sethuraman et al. | 375/240.12 |
| 2004/0190622 A1 * | 9/2004 | Schutten et al. | 375/240.16 |
| 2005/0107982 A1 * | 5/2005 | Sun et al. | 702/179 |
| 2006/0182356 A1 * | 8/2006 | Lillevold | 382/236 |
| 2006/0221252 A1 * | 10/2006 | Zhou et al. | 348/700 |
| 2006/0222078 A1 * | 10/2006 | Raveendran | 375/240.16 |
| 2007/0070250 A1 * | 3/2007 | Zhou et al. | 348/607 |

OTHER PUBLICATIONS

P. Besl and R. Jain, "Segmentation through variable-order surface fitting," IEEE Trans. Pattern Analysis and Machine Intelligence, 1988, pp. 167-192, vol. 10, No. 2.
K. Rank, M. Lendl, and R. Unbehauen, "Estimation of image noise variance," IEEE Proc.-Vision, Image and Signal Processing, 1999, pp. 80-84, vol. 146, No. 2.
B.R. Corner, R.M. Narayanan, and S.E. Reichenbach, "Noise estimation in remote sensing imagery using data masking," Int. J. Remote Sensing, 2003, pp. 689-702, vol. 24, No. 4.
P. Meer and J.M. Jolion, "A fast parallel algorithm for blind estimation of noise variance," IEEE Trans Pattern Analysis and Machine Intelligence, 1990, pp. 216-223, vol. 12.

(Continued)

*Primary Examiner*—Behrooz Senfi
(74) *Attorney, Agent, or Firm*—Kenneth L. Sherman, Esq.; Michael Zarrabian, Esq.; Myers Andras Sherman LLP

(57) ABSTRACT

A method for reliability estimation of temporal noise estimation in a sequence of video frames. The temporal local differences from a difference between a previous frame and a next frame in the sequence of frames is determined. A distribution of the temporal local difference is determined. Characteristics values of the distribution are determined. The characteristics values are compared to the thresholds to obtain an indication of the reliability of the temporal noise estimation. If the estimated noise variance is determined as not reliable, it will be discarded and the previous estimated reliable noise variance will be used instead indicating the noise level of the current frame.

18 Claims, 10 Drawing Sheets

OTHER PUBLICATIONS

R. Bracho, and A.C. Sanderson, "Segmentation of images based on intensity gradient information," in Proceedings of CVPR-85 Conf. on Computer Vision and Pattern Recognition, San Francisco, 1985, pp. 341-347.

H. Voorthees and T. Possio, "Detecting blots as textons in natural images," in Proc. Image Understanding Workshop, Los Angeles, CA, 1987, pp. 23-25.

J.S. Lee, "Refined filtering of image noise using local statistics," CVGIP, Praph, Models Image Proc., 1981, pp. 380-389, vol. 5.

S.I. Olsen, "Estimation of noise in images: An evaluation," CVGIP, Praph, Models Image Proc., 1999, pp. 319-323, vol. 55.

* cited by examiner

400

600

800

910

RELIABILITY ESTIMATION OF TEMPORAL NOISE ESTIMATION

FIELD OF THE INVENTION

The present invention relates generally to video processing, and more particularly to noise estimation in video signal processing.

BACKGROUND OF THE INVENTION

Noise estimation is required in many algorithms to process image or video optimally. For example, in TV system, noise reduction is often applied as the first step to obtain noise-free video sequences. An optimal algorithm of noise reduction first estimates the noise variance of input video sequences, and then performs noise reduction. Noise estimation is very important in this case, because overestimation leads to image blurring and underestimation leads to insufficient noise reduction.

In order to describe the problem of noise estimation, let $g_t$ denote the incoming video frame at time instant t and $g_t(i,j)$ denote the corresponding pixel value at the coordinates (i,j) where i represents the ordinate and j represents the abscissa. Generally, we assume the input video sequence is corrupted by independent, identically distributed additive and stationary zero-mean Gaussian noise with variance $\sigma_0^2$, that is, any pixel $g_t(i,j)$ can be denoted as:

$$g_t(i,j) = f_t(i,j) + n_t(i,j), \quad (1)$$

where $f_t(i,j)$ denotes the true pixel value without noise corruption and $n_t(i,j)$ is the Gaussian distributed noise component satisfying $$n_t(i,j) \sim N(0, \sigma_0^2). \quad (2)$$

Thus, the problem of noise estimation is to estimate the noise variance $\sigma_0^2$ of the contaminated image $g_t$ without the priori information of the original image $f_t$.

A straightforward method of noise estimation is to compute the expectation of the local variance of image $g_t$. This method suffers from the image structure, causing overestimation. To overcome this problem, several methods have been proposed. One method excludes the local variance if the gradient magnitude of the corresponding pixel is greater than a preset threshold. However, the gradient magnitude is also related with the noise variance, so it is difficult to find an appropriate threshold. Other conventional methods first extract the noise component with little structure by applying high-pass filters on the contaminated image $g_t$, and then perform noise estimation on the noise component. One example decomposes the image into a pyramid structure of different block sizes, wherein the noise variance is estimated from a sequence of four smallest block-based local variances at each level. Another example, a Rayleigh distribution is fitted to the magnitude of the intensity gradient, wherein noise variance is estimated based on the attribute that the Rayleigh probability density function reaches maximum at value $\sigma_0$. Other methods estimate multiplicative as well as additive noise.

All of the above methods utilize the spatial local statistics to estimate noise variance. The estimation accuracy depends on the separation of the noise component and the real image signal. The robustness degrades greatly if most of image contains complicated structure.

BRIEF SUMMARY OF THE INVENTION

The present invention addresses the above shortcomings. In one embodiment, the present invention provides a method for reliable noise estimation in a set of video frames. If there is no motion between two consecutive frames, the temporal local difference between two small blocks at the same spatial position in the two consecutive frames satisfies a certain distribution whose statistical characteristics are already known (the shape of the distribution curve is already known). The estimated noise variance derived from such distribution is very reliable. If motion exists between two consecutive frames, the distribution of the temporal local difference is affected by the motion information, may lead to unpredictable statistical characteristics. The estimated noise variance derived from such distribution is not reliable.

To improve the performance of the noise estimation method, the reliability of the estimated noise variance can be estimated. If the estimated noise variance is not reliable, it is discarded and the previous estimated reliable noise variance is used instead. To estimate the reliability, the ideal distribution curve of the temporal local difference is obtained by assuming the estimated noise variance is reliable. Then, the real distribution curve of the temporal local difference is compared with the ideal one. If they are very similar, the obtained noise variance is truly reliable. Otherwise, it is not reliable. The reliability thus can be calculated from the similarity of those two distributions. Since it may be difficult to measure the similarity of two distribution curves, instead of doing so, some characteristic values describing the shape of the distribution curves can be calculated. The obtained noise variance is reliable only if the characteristic values of the distribution of the temporal local difference are close to those of the ideal distribution.

In one implementation, the present invention provides a method for reliability estimation of temporal noise estimation in a sequence of video frames, comprising the steps of: obtaining temporal local difference signals from the difference between a previous frame and a next frame in the sequence of frames; determining a distribution of the temporal local difference; determining the characteristic values of the distribution; and comparing the characteristic values to expected values to obtain an indication of the reliability of the temporal noise estimation.

Other embodiments, features and advantages of the present invention will be apparent from the following specification taken in conjunction with the following drawings.

DETAILED DESCRIPTION OF THE INVENTION

Figure 1:
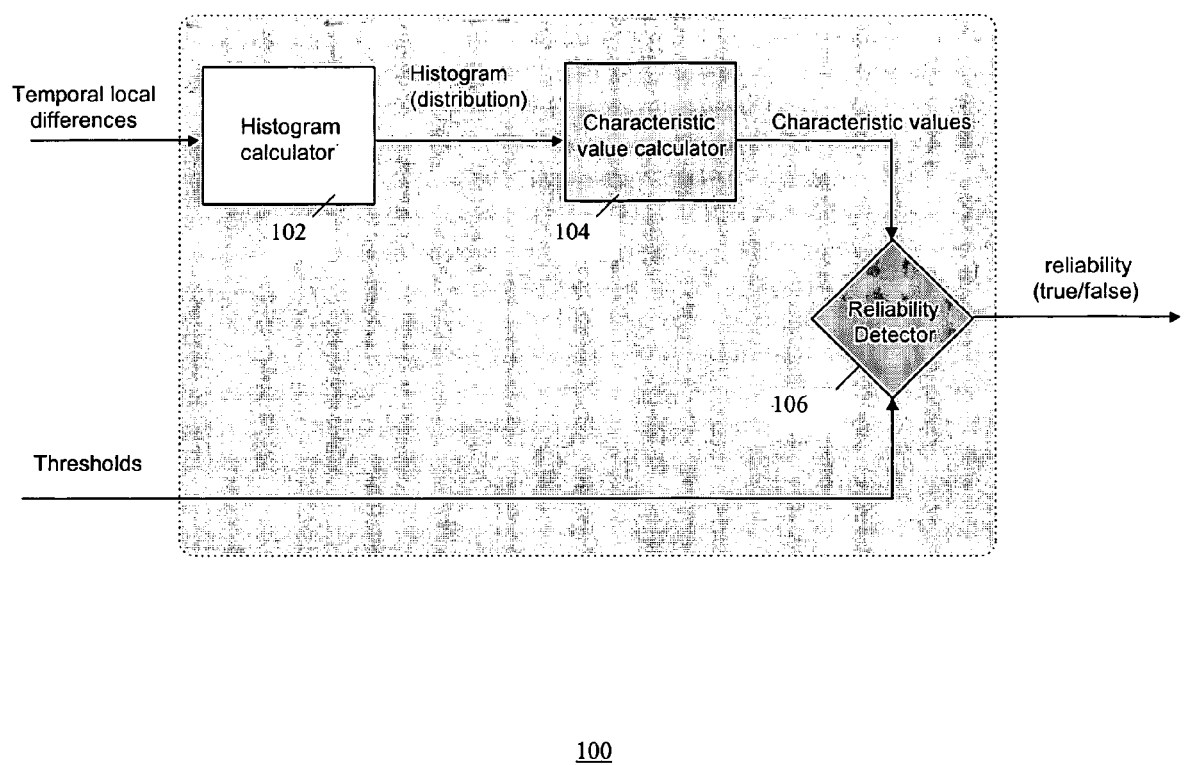
FIG. 1 shows a block diagram of an embodiment of a reliability estimator according for temporal noise estimation according to the present invention.

Referring to the drawings, embodiment of the present invention is described below. In one embodiment, the present invention provides a method for reliable noise estimation in a sequence of video frames. If there is no motion between two frames, estimation of noise variance based on a temporal local difference between two small blocks at the same spatial position in the two consecutive frames satisfies a certain distribution whose statistical characteristics are already known (the shape of the distribution curve is already know). The estimated noise variance derived from such distribution is very reliable. If motion exists between two consecutive frames, the distribution of the temporal local difference is affected by the motion information, may lead to unpredictable statistical characteristics. The estimated noise variance derived from such distribution is not reliable.

To improve the performance of the noise estimation method, the reliability of the estimated noise variance can be estimated. If the estimated noise variance is not reliable, it is discarded and the previous estimated reliable noise variance is used instead. To estimate the reliability, the ideal distribution curve of the temporal local difference is obtained by assuming the estimated noise variance is reliable. Then the real distribution curve of the temporal local difference is compared with the ideal one. If they are very similar, the obtained noise variance is truly reliable. Otherwise, it is not reliable. The reliability thus can be calculated from the similarity of those two distributions. Since it may be difficult to measure the similarity of two distribution curves, instead of doing so, some characteristic values describing the shape of the distribution curves can be calculated. The obtained noise variance is reliable only if the characteristic values of the distribution of the temporal local difference are close to those of the ideal distribution.

In the commonly assigned patent application Ser. No. 10/991,265, "methods to estimate noise variance from a video sequence," (incorporated herein by reference), the noise variance (standard deviation) is estimated based on the distribution of the temporal local difference, such as mean absolute error (MAE) between two small blocks at the same spatial position of two consecutive frames.

In one aspect the present invention provides an extension of said commonly assigned patent application, wherein according to an embodiment of the present invention it is assumed that the temporal local difference of each pixel is already known (e.g., obtained by the method described in said commonly assigned patent application). It is assumed that the estimated noise variance is reliable to obtain the ideal distribution curve of the temporal local difference. On the other hand, the real distribution curve can be obtained from the histogram of the temporal local difference. By comparing the real curve with the ideal one, it can be determined that the estimated noise variance is truly reliable or not. For convenience, some characteristic values are computed which indicate the shape of the real distribution curve which are independent of the noise variance. The characteristic values obtained from the ideal distribution are used as thresholds (described in more detail further below). Therefore, the reliability of the estimated noise variance can be determined by comparing the characteristic values of the real distribution with some thresholds.

The framework of reliability estimation of temporal noise estimation is shown by an example block diagram of a system 100 in FIG. 1 according to an embodiment of the present invention. The system 100 includes a histogram calculator 102, a characteristic value calculator 104, and a reliability detector 106. The inputs to the system 100 are temporal local difference signals and thresholds, and the output of the system 100 is a reliability estimation. The histogram calculator 102 determines the histogram (distribution) of the temporal local difference, and the characteristic value calculator 104 calculates the characteristic values from the histogram (distribution). Comparing the characteristic values of the temporal local difference and the thresholds, the reliability detector 106 outputs said reliability estimation, according to the present invention.

An example operation of the system 100 is described in more detail below. To estimate the reliability, the temporal local difference input is provided to the histogram calculator 102 to obtain the histogram/distribution. The characteristic value calculator 104 computes some characteristic values, wherein the reliability detector 106 compares the characteristic value to the threshold(s) to determine whether the estimated noise variance is reliable or not. Only reliable estimated noise variance (standard deviation) is used, and unreliable ones are discarded.

Figure 2:
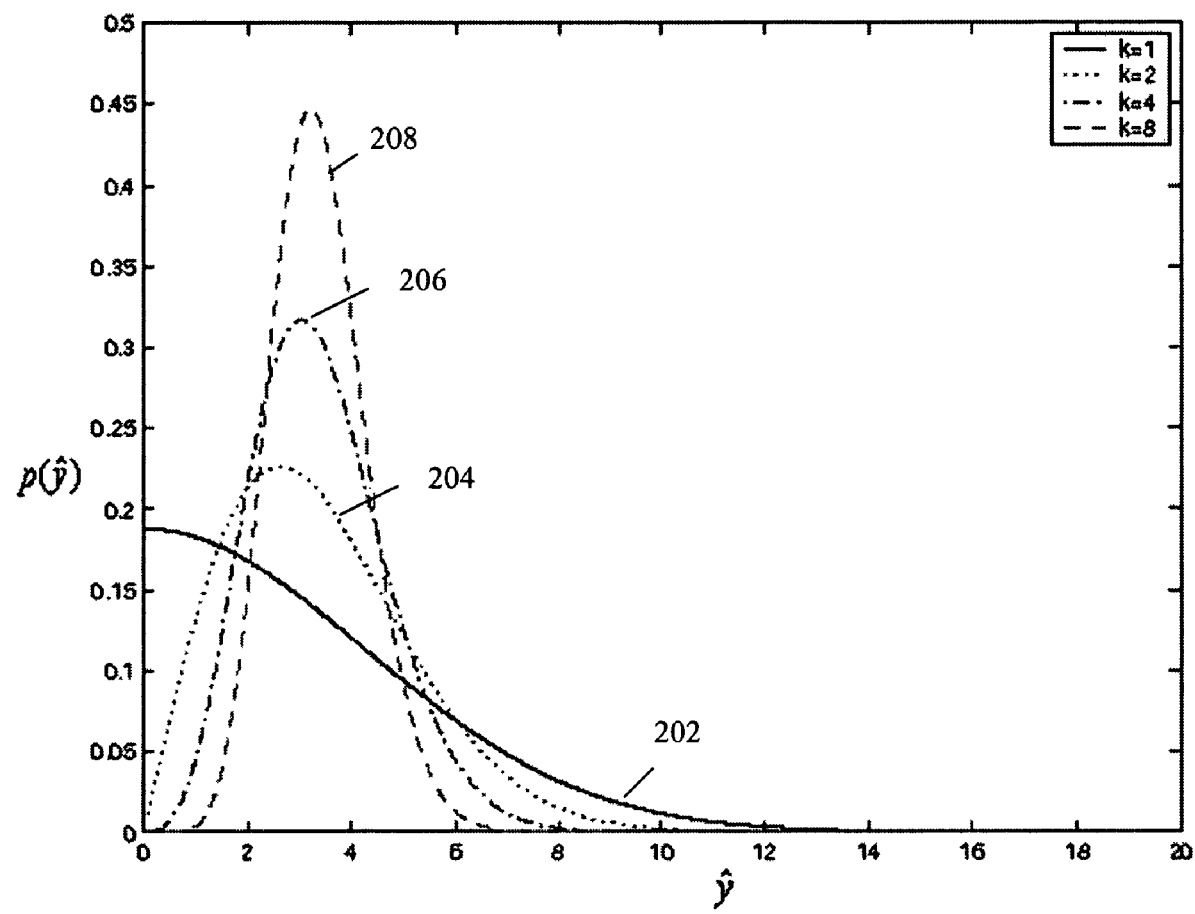
FIG. 2 shows examples of the distribution of MAE between two small blocks at the same spatial position of two consecutive frames without motion.

In the following, three examples of reliability estimation according to the present invention, which can be implemented in variations of the system 100 of FIG. 1, are described. For these examples, assume that MAE is the temporal local difference, and that the ideal distribution of the MAE (if no motion exists between two consecutive frames) is as shown by example 200 in FIG. 2 as curves 202, 204, 206 and 208, where k=H×W is the block size to compute MAE. The example curves 202, 204, 206 and 208 in FIG. 2 correspond to the cases where the value k=H×W is 1, 2, 4, 8, respectively. (x-axis denotes $\hat{y}$ and the y-axis denotes $p(\hat{y})$ described below).

Let $\hat{y}$ be the MAE, and $p(\hat{y})$ be the probability density function (p.d.f.) of the distribution from the histogram calculator 102 (FIG. 1). The same histogram calculator is used to obtain the normalized histogram $h(\hat{y})$ of the MAE that is the input in the three examples below.

Example 1

Figure 3:
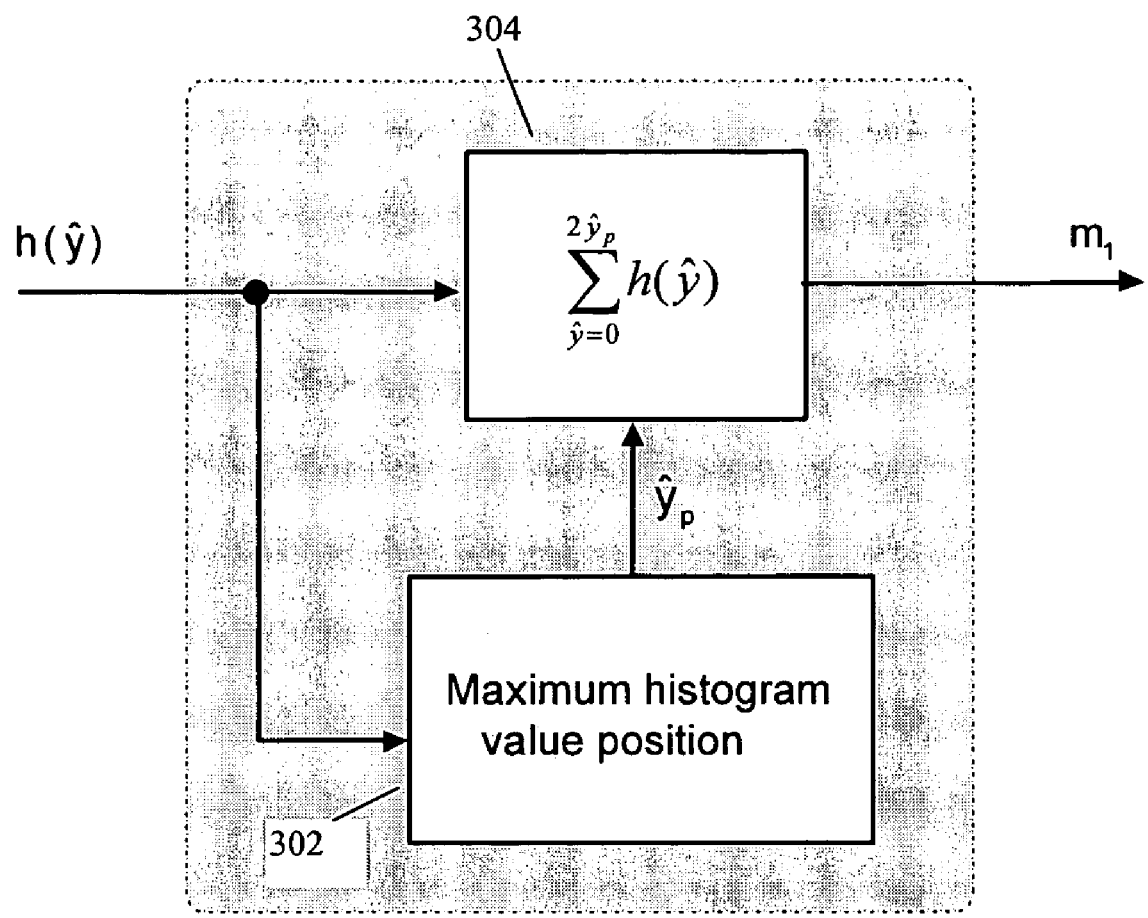
FIG. 3 shows an example implementation of characteristic value calculator of FIG. 1.

The first example implementation of the characteristic value calculator 104 and the reliability detector 106 are now described. The first example of the characteristic value calculator 104 is shown by the example block diagram of a unit 300 of FIG. 3. In the unit 300, a maximum histogram value position calculator 302 determines $\hat{y}_p$ as the MAE value corresponding to the maximum histogram value according to relation (3) below:

$$\hat{y}_p = \underset{\hat{y}}{\operatorname{argmax}}\ h(\hat{y}). \quad (3)$$

In this implementation, the first characteristic value $m_1$ is obtained by summing unit 304 according to relation (4) below:

$$m_1 = \sum_{\hat{y}=0}^{2\hat{y}_p} h(\hat{y}). \quad (4)$$

Relation (4) above is equivalent to integration of the p.d.f. $p(\hat{y})$ over the interval $[0, 2\hat{y}_p]$, as shown in relation (5) below:

$$m_1 = \int_0^{2\hat{y}_p} p(\hat{y}) d\hat{y}. \tag{5}$$

In the ideal case (no motion between the two consecutive frames), it can be obtained that $m_1 \approx 1$ If motion exists, $m_1$ decreases. Therefore, given a threshold $t_1$ ($t_1 \leq 1$) if $m_1 \geq t_1$, we say that there is no motion and the estimated noise is reliable.

Figure 4:
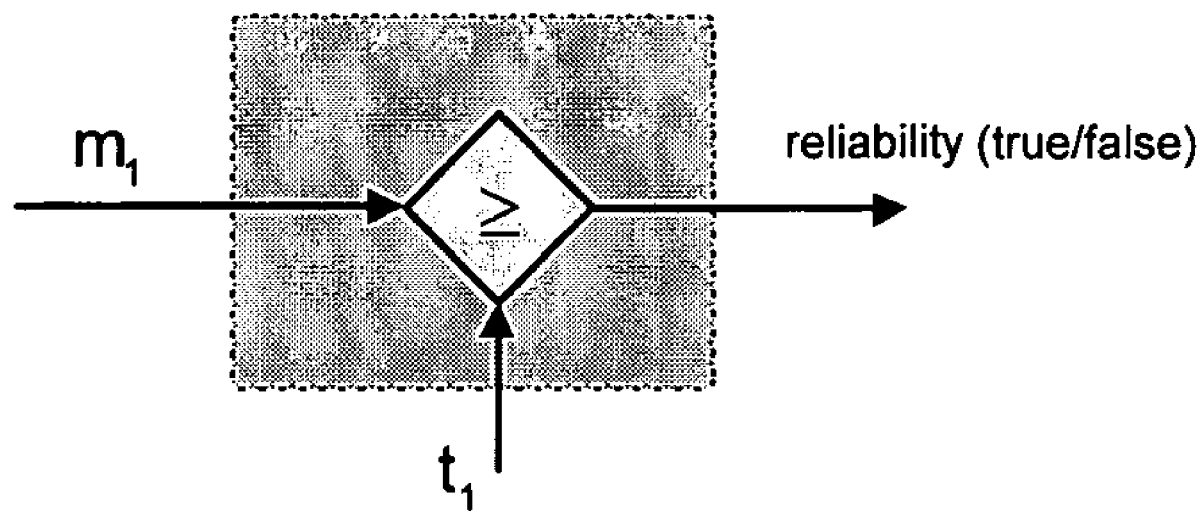
FIG. 4 shows an example implementation of reliability detector of FIG. 1.

According to the above analysis, the first example of the reliability detector 106 (FIG. 1) can implemented as shown by the example in FIG. 4 as the unit 400, which inputs the first characteristic value $m_1$ and the threshold value $t_1$ to provide a reliability indication. The function of unit 400 comprises determining: if $m_1 \geq t_1$, then reliability=1 (i.e., "true"); otherwise, reliability=0 (i.e., "false"). The output "true" indicates reliable while the output "false" indicates not reliable.

In application, the integration or summation range is not limited to $[0, 2\hat{y}_p]$. If another range is used, the threshold value $t_1$ should be adjusted correspondingly.

Example 2

Figure 5:
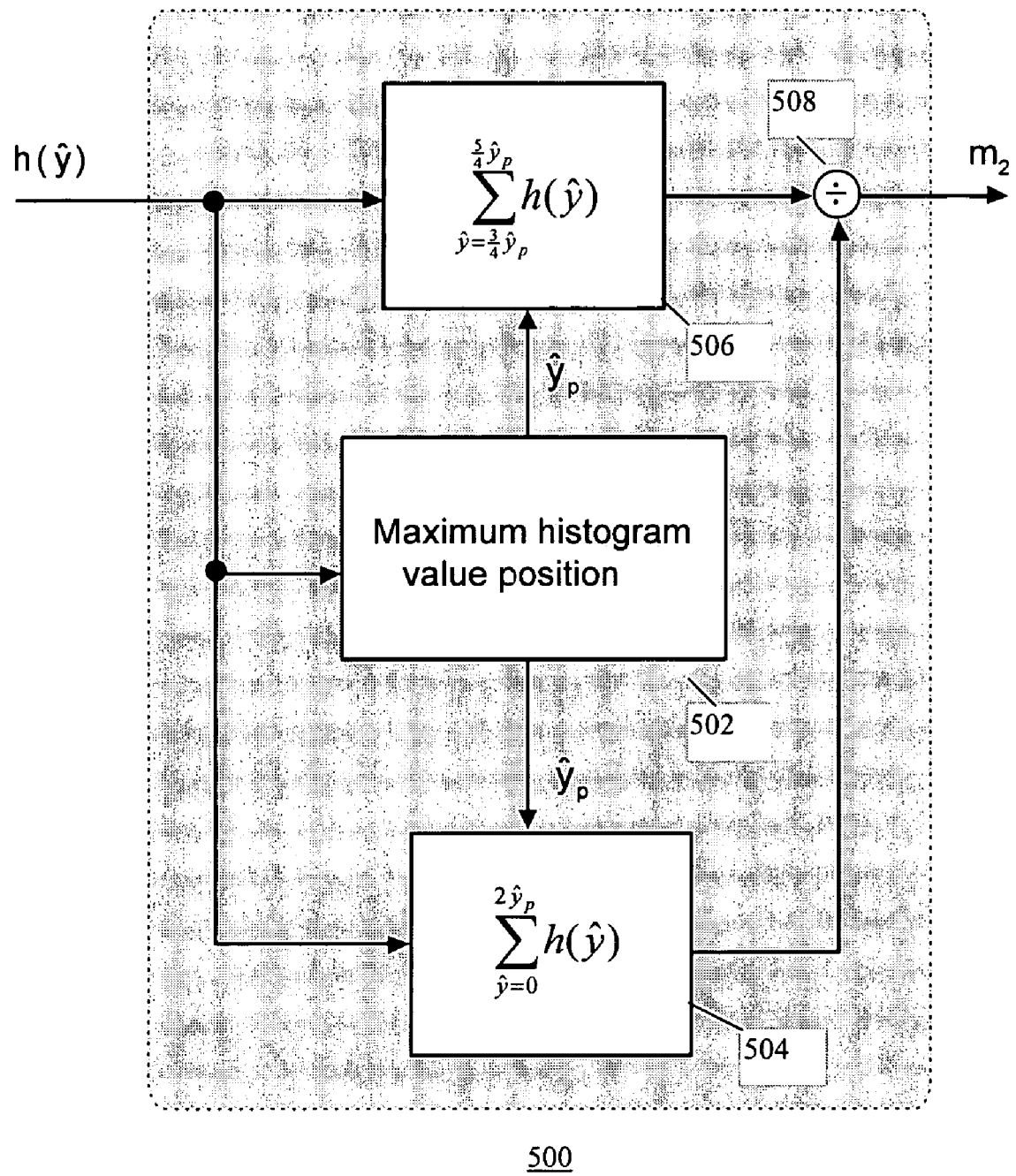
FIG. 5 shows another example implementation of characteristic value calculator of FIG. 1.

The second example implementation of the characteristic value calculator 104 and the reliability detector 106 are now described. The second example implementation of the characteristic calculator 104 (FIG. 1) is shown by the block diagram of a unit 500 in the example of FIG. 5. A maximum histogram value position calculator 502 determines $\hat{y}_p$ according to relation (3) above. Then, the first summation unit 504 determines the sum:

$$\sum_{\hat{y}=0}^{2\hat{y}_p} h(\hat{y}).$$

Further, the second summation unit 506 determines the sum:

$$\sum_{\hat{y}=\frac{3}{4}\hat{y}_p}^{\frac{5}{4}\hat{y}_p} h(\hat{y}).$$

Then, a divider 508 divides said two sums, such that unit 500 generates the characteristic value $m_2$ according to relation (6) below:

$$m_2 = \frac{\sum_{\hat{y}=\frac{3}{4}\hat{y}_p}^{\frac{5}{4}\hat{y}_p} h(\hat{y})}{\sum_{\hat{y}=0}^{2\hat{y}_p} h(\hat{y})}. \tag{6}$$

The characteristic value $m_2$ is equivalent to the normalized integration of the p.d.f. $p(\hat{y})$ in the central area $$\left[\frac{3}{4}\hat{y}_p, \frac{5}{4}\hat{y}_p\right],$$

according to relation (7) below:

$$m_2 = \frac{\int_{\frac{3}{4}\hat{y}_p}^{\frac{5}{4}\hat{y}_p} p(\hat{y}) d\hat{y}}{\int_0^{2\hat{y}_p} p(\hat{y}) d\hat{y}} \tag{7}$$

Figure 6:
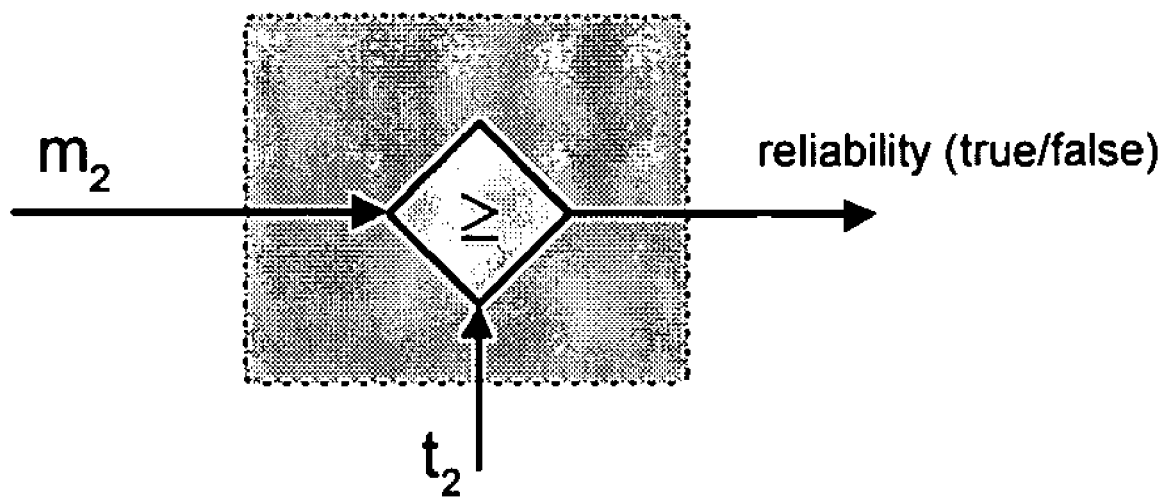
FIG. 6 shows another example implementation of reliability detector of FIG. 1.

In the ideal case (i.e., no motion between the two consecutive frames), it can be derived that $m_2$ is close to a constant value, denoted as $C_{m_2}$. This constant value is related to the block size $k = H \times W$. If motion exists, it often leads to a flatter distribution of $\hat{y}$ and a smaller $m_2$. Therefore, given a threshold $t_2$ ($t_2 \leq C_{m_2}$), if $m_2 \geq t_2$, we say that there is no motion and the estimated noise variance is reliable. According to the above analysis, the second example of the reliability detector 106 (FIG. 1) implements the function 600 in the example FIG. 6, which inputs the second characteristic value $M_2$ and the threshold value $t_2$ to provide a reliability indication wherein according to unit 600, if $m_2 \geq t_2$, it is assumed that there is no motion and the estimated noise variance is reliable.

In application, the integration or summation range is not limited to $$\left[\frac{3}{4}\hat{y}_p, \frac{5}{4}\hat{y}_p\right]$$

and $[0, 2\hat{y}_p]$. If other values are used, the threshold value $t_2$ should be adjusted correspondingly.

Example 3

Figure 7:
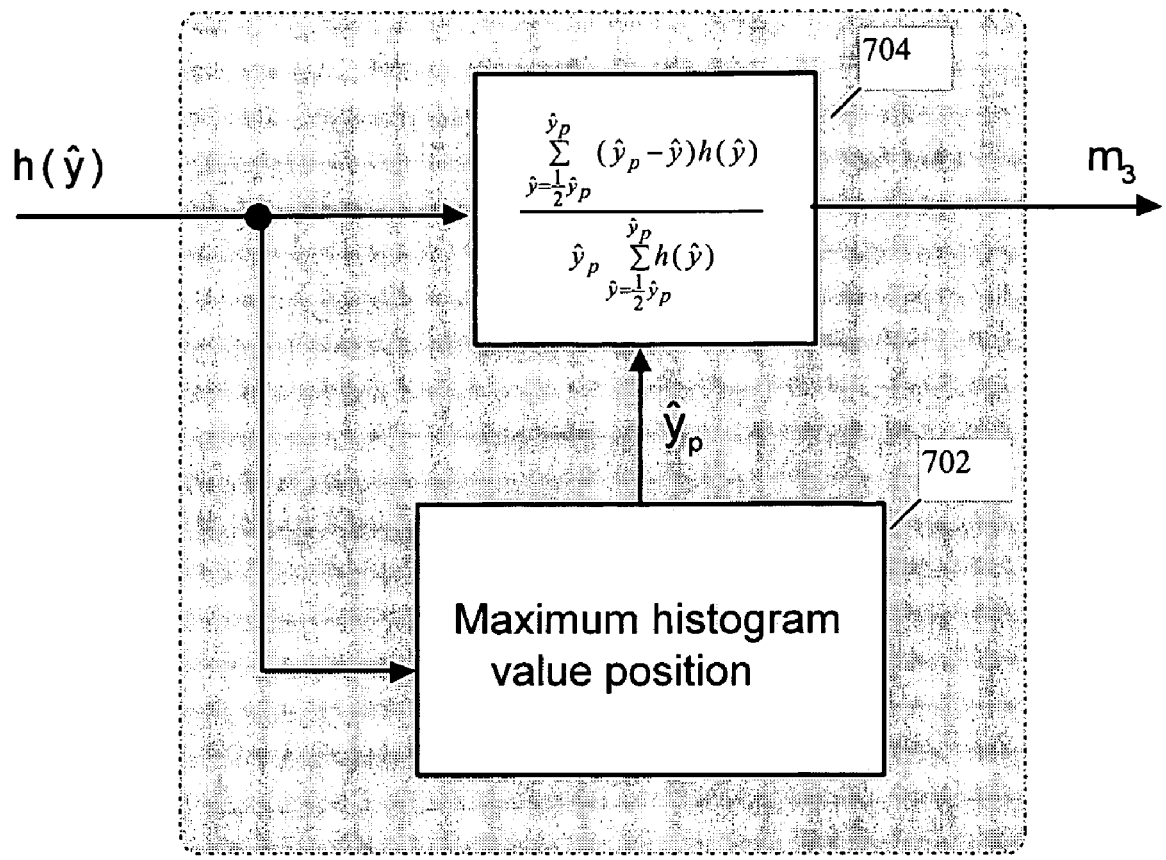
FIG. 7 shows another example implementation of characteristic value calculator of FIG. 1.

The third example implementation of the characteristic calculator 104 and the reliability detector 106 are now described. The third example implementation of the characteristic value calculator 104 (FIG. 1) is shown by the block diagram of a unit 700 in the example of FIG. 7. A maximum histogram value position calculator 702 determines $\hat{y}_p$ according to relation (3) above. Then, a summation unit 704 determines a characteristic value $m_3$ according to relation (8) below:

$$m_3 = \frac{\sum_{\hat{y}=\frac{1}{2}\hat{y}_p}^{\hat{y}_p} (\hat{y}_p - \hat{y}) \cdot h(\hat{y})}{\hat{y}_p \cdot \sum_{\hat{y}=\frac{1}{2}\hat{y}_p}^{\hat{y}_p} h(\hat{y})}. \tag{8}$$

The characteristic value $m_3$ is equivalent to a normalized shape parameter over the range $$\left[\frac{1}{2}\hat{y}_p, \hat{y}_p\right],$$

according to relation (9) below:

$$m_3 = \frac{\int_{\frac{1}{2}\hat{y}_p}^{\hat{y}_p}(\hat{y}_p - \hat{y}) \cdot p(\hat{y}) \cdot d\hat{y}}{\hat{y}_p \cdot \int_{\frac{1}{2}\hat{y}_p}^{\hat{y}_p} p(\hat{y}) \cdot d\hat{y}}. \quad (9)$$

Figure 8:
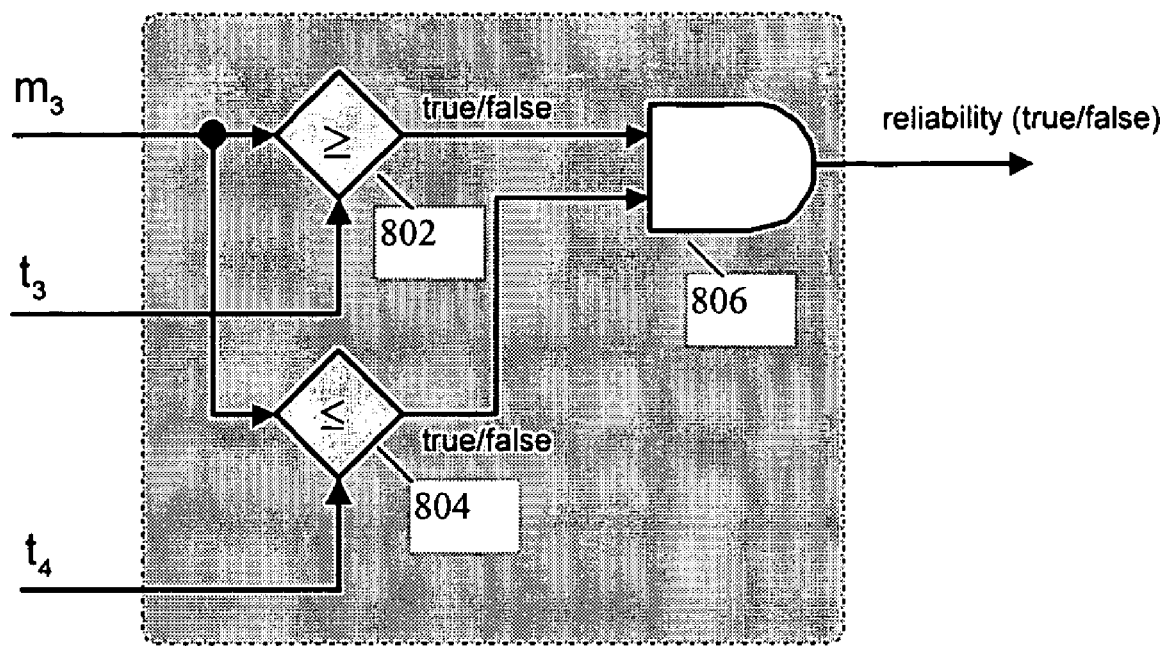
FIG. 8 shows another example implementation of reliability detector of FIG. 1.

In the ideal case (no motion between the two consecutive frames), it can be derived that $m_3$ is close to a constant value, denoted as $C_{m_3}$. This constant value is related to the block size k=H×W as well. Therefore, given thresholds $t_3(t_3<C_{m_3})$ and $t_4(t_4>C_{m_3})$, if $t_3 \leq m_3 \leq t_4$, we say that there is no motion and the estimated noise variance is reliable. The third example of the reliability detector 106 (FIG. 1) implements the detection function 800 in the example FIG. 8. The detection function comprises the functional units 802, 804 and 806, which input the third characteristic value $M_3$ and the threshold values $t_3$ and $t_4$ to provide a reliability indication. Function units 802 and 804 are Boolean functions, and the function unit 806 is an AND function, wherein the units 802, 804 and 806 together determine if $t_3 \leq m_3 \leq t_4$.

In application, the integration or summation range above is not limited to $$\left[\frac{1}{2}\hat{y}_p, \hat{y}_p\right].$$

If another value is used, the threshold values $t_3$ and $t_4$ should be adjusted correspondingly.

The above implementations can be combined arbitrarily to obtain more robust result. An example system 900 which combines three reliability estimators 902, 904 and 906, i.e., Reliability Estimator 1, Reliability Estimator 2 and Reliability Estimator 3, respectively. The system 900 inputs the histogram h(ŷ) and outputs a combined reliability indicator. The Reliability Estimator 1 implements reliability estimation according to FIG. 1 and Example 1 above, and generates the first reliability indicator "reliability 1". The Reliability Estimator 2 implements reliability estimation according to FIG. 1 and Example 2 above, and generates the second reliability indicator "reliability 2". The Reliability Estimator 3 implements reliability estimation according to FIG. 1 and Example 3 above, and generates the third reliability indicator "reliability 3". The results from the Reliability Estimator 1, Reliability Estimator 2 and Reliability Estimator 3 (i.e., "reliability 1", "reliability 2" and "reliability 3", respectively) are combined by the Final Decision unit 908 to generate the final, combined reliability indication output for the system 900. As those skilled in the art will recognize, other example combinations are possible according to the present invention.

Figure 9:
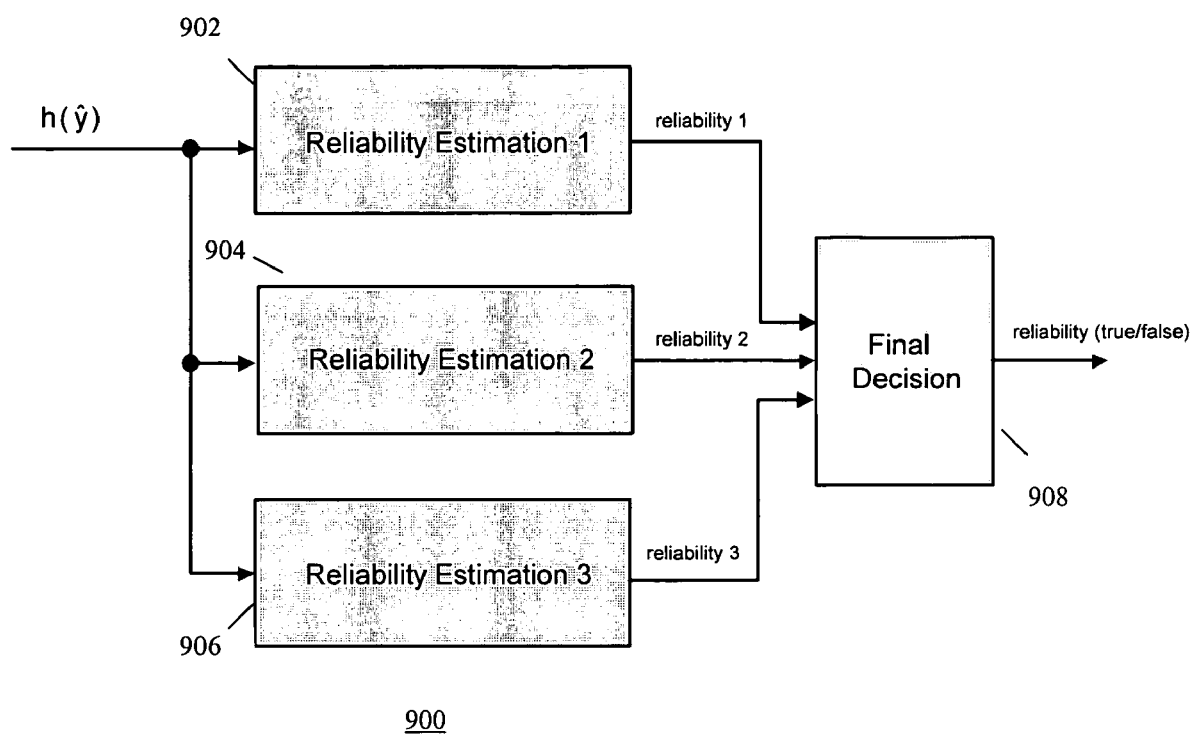
FIG. 9 shows a block diagram of an embodiment of a combination reliability estimator according to the present invention.
Figure 10:
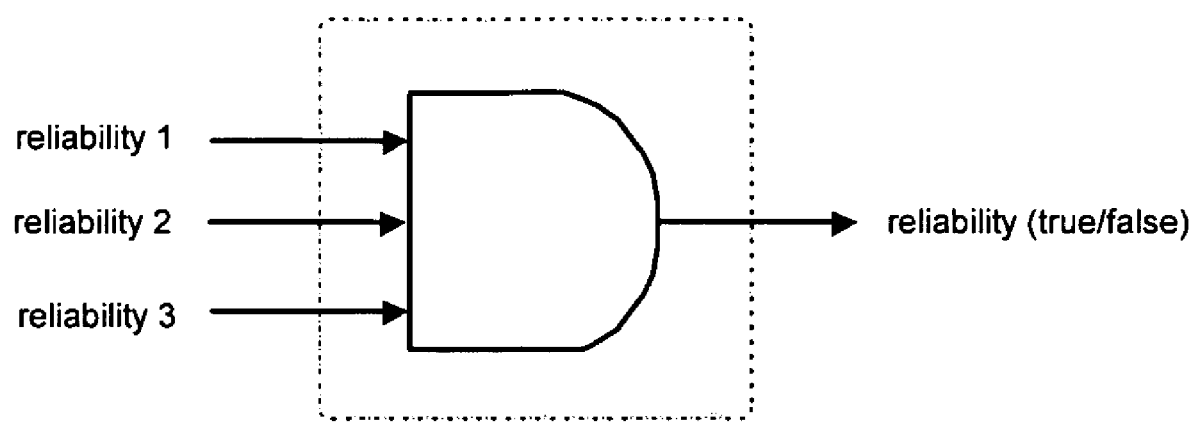
FIG. 10 shows an example implementation of the final decision unit of FIG. 9.

An example implementation of the Final Decision unit 908 of FIG. 9 is shown as the function 910 (logic AND) shown in the example of FIG. 10. As those skilled in the art will recognize, other examples for the function 910 are possible according to the present invention.

If the estimated noise variance is determined as not reliable, it will be discarded and the previous estimated reliable noise variance will be used instead indicating the noise level of the current frame.

As those skilled in the art will recognize, the present invention can be used on both progressive and interlaced videos. The even and odd fields in an interlaced video can be processed as two separate progressive video sequences; or the fields can be merged into a single frame prior to be processed.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for reliability estimation of a temporal noise estimation in a sequence of video frames, comprising:
    employing a processor for:
        obtaining temporal local differences from a difference between a previous frame and a next frame in a sequence of frames;
        determining an actual distribution for the temporal local differences;
        determining actual characteristic values for the actual distribution wherein the actual characteristic values indicate statistical characteristics of the actual distribution;
        comparing the actual characteristic values to one or more thresholds to obtain an indication of a reliability of a temporal noise estimation in the sequence of frames, wherein the thresholds comprise characteristic values based on statistical characteristics of an ideal distribution; and,
        providing the indication of the reliability of the temporal noise estimation.

2. The method of claim 1 wherein determining said actual distribution further comprises determining the actual distribution comprising a histogram of the temporal local differences.

3. The method of claim 1 further comprising:
    determining said differences between the previous frame and the next frame in the sequence of frames; wherein the comparing is based on pre-defined criteria.

4. The method of claim 1 wherein determining actual characteristic values of the actual distribution fun her includes determining an actual characteristic value $m_1$ as a reliability measurement, by computing:

$$m_1 = \sum_{\hat{y}=0}^{2\hat{y}_p} h(\hat{y}),$$

where ŷ represents a MAE of said temporal local differences;
h(ŷ) represents said actual distribution comprising a histogram; and
$\hat{y}_p$ is an MAE value corresponding to a maximum value of h(ŷ).

5. The method of claim 4, further comprising determining as a MAE value corresponding to the maximum value of h(ŷ) by computing:

$$\hat{y}_p = \underset{\hat{y}}{\mathrm{argmax}}\, h(\hat{y}).$$

6. The method of claim 1 wherein determining actual characteristic values of the actual distribution further includes determining an actual characteristic value $m_2$ as a reliability measurement, by computing:

$$m_2 = \frac{\sum_{\hat{y}=\frac{3}{4}\hat{y}_p}^{\frac{5}{4}\hat{y}_p} h(\hat{y})}{\sum_{\hat{y}=0}^{2\hat{y}_p} h(\hat{y})},$$

where $\hat{y}$ represents a MAE of said temporal local difference;

$h(\hat{y})$ represents said actual distribution comprising a histogram; and $\hat{y}_p$ represents a MAE value corresponding to a maximum value of $h(\hat{y})$.

7. The method of claim 1 wherein determining actual characteristic values of the actual distribution further includes determining an actual characteristic value $m_3$ as a reliability measurement, by computing:

$$m_3 = \frac{\sum_{\hat{y}=\frac{1}{2}\hat{y}_p}^{\hat{y}_p} (\hat{y}_p - \hat{y}) \cdot h(\hat{y})}{\hat{y}_p \cdot \sum_{\hat{y}=\frac{1}{2}\hat{y}_p}^{\hat{y}_p} h(\hat{y})},$$

where $\hat{y}$ represents a MAE of said difference;

$h(\hat{y})$ represents said actual distribution comprising a histogram; and $\hat{y}_p$ represents a MAE value corresponding to the maximum value of $h(\hat{y})$.

8. A method for reliability estimation of a temporal noise estimation in a sequence of video frames, comprising:
   employing a processor for:
      determining a plurality of reliability estimates, wherein each reliability estimate is determined by a different method; and
      combining the plurality of reliability estimations to generate a combined reliability estimate;
   wherein determining each reliability estimate further comprises:
      obtaining temporal local differences from the difference between a previous frame and a next frame in a sequence of frames;
      determining an actual distribution of the temporal local differences;
      determining actual characteristic values of the actual distribution, wherein the actual characteristic values indicate statistical characteristics of the actual distribution; and
      comparing the actual characteristic values to one or more thresholds to obtain an indication of a reliability of a temporal noise estimation in the sequence of frames, wherein the thresholds are characteristic values based on statistical characteristics of an ideal distribution.

9. A reliability estimator for determining reliability estimation of temporal noise estimation in a sequence of video frames, comprising:
   a differencing means that determines the temporal local differences from the difference between a previous frame and a next frame in a sequence of frames;
   a distribution calculator that determines an actual distribution of the temporal local differences;
   a characteristic value calculator that determines actual characteristic values of the actual distribution, wherein the actual characteristic values indicate statistical characteristics of the actual distribution; and
   a reliability detector that compares the actual characteristic values to one or more thresholds to obtain an indication of the reliability of the temporal noise estimation in the sequence of frames, wherein the thresholds are characteristic values based on statistical characteristics of an ideal distribution.

10. The reliability estimator of claim 9 wherein the distribution calculator further determines the actual distribution comprising a histogram of the temporal local difference.

11. The reliability estimator of claim 9 wherein the differencing means further determines said difference between the previous frame and the next frame.

12. The reliability estimator of claim 9 wherein the characteristic value calculator further determines an actual characteristic value $m_1$ as a reliability measurement, by computing:

$$m_1 = \sum_{\hat{y}=0}^{2\hat{y}_p} h(\hat{y}),$$

where $\hat{y}$ represents a MAE of said temporal local difference;

$h(\hat{y})$ represents said actual distribution comprising a histogram; and $\hat{y}_p$ is a function of the MAE value corresponding to a maximum value of $h(\hat{y})$.

13. The reliability estimator of claim 12, wherein the characteristic value calculator further determines $\hat{y}$ as the MAE value corresponding to the maximum value of $h(\hat{y})$ by computing:

$$\hat{y}_p = \underset{\hat{y}}{\arg\max}\, h(\hat{y}).$$

14. The reliability estimator of claim 9 wherein the characteristic value calculator further determines an actual characteristic value $m_2$ as a reliability measurement, by computing:

$$m_2 = \frac{\sum_{\hat{y}=\frac{3}{4}\hat{y}_p}^{\frac{5}{4}\hat{y}_p} h(\hat{y})}{\sum_{\hat{y}=0}^{2\hat{y}_p} h(\hat{y})},$$

where $\hat{y}$ represents a MAE of said temporal local difference;

$h(\hat{y})$ represents said actual distribution comprising a histogram; and $\hat{y}_p$ represents a MAE value corresponding to the maximum value of $h(\hat{y})$.

15. The reliability estimator of claim 9 wherein the characteristic value calculator further determines an actual characteristic value $m_3$ as a reliability measurement, by computing:

$$m_3 = \frac{\sum_{\hat{y}=\frac{1}{2}\hat{y}_p}^{\hat{y}_p} (\hat{y}_p - \hat{y}) \cdot h(\hat{y})}{\hat{y}_p \cdot \sum_{\hat{y}=\frac{1}{2}\hat{y}_p}^{\hat{y}_p} h(\hat{y})},$$

where $\hat{y}$ represents a MAE of said difference;
$h(\hat{y})$ represents said actual distribution comprising a histogram; and
$\hat{y}_p$ represents a MAE value corresponding to a maximum value of $h(\hat{y})$.

16. A reliability estimation system that determines reliability estimation of a temporal noise estimation in a sequence of video frames, comprising:
a plurality of reliability estimators, wherein each reliability estimator determines a reliability estimate by a different method; and
a combiner that combines the reliability estimations from the reliability estimators to generate a combined reliability estimate;
wherein each reliability estimator comprises:
a differencing means that determines temporal local differences from a difference between a previous frame and a next frame in a sequence of frames;
a distribution calculator that determines an actual distribution of the temporal local differences;
a characteristic value calculator that determines actual characteristic values of the actual distribution, wherein the actual characteristic values indicate statistical characteristics of the actual distribution; and
a reliability detector that compares the actual characteristic values to one or more thresholds to obtain an indication of the reliability of the temporal noise estimation in the sequence of frames, wherein the thresholds are characteristic values based on statistical characteristics of an ideal distribution.

17. The reliability estimation system of claim 16, wherein each indication of the reliability of the temporal noise spectrum comprises a Boolean output, and, wherein the combiner comprises an AND gate, wherein each indication of the temporal noise spectrum is coupled to inputs of the AND gate, and the output of the AND gate generates a combined reliability indication Boolean output for the system.

18. The method of claim 1, wherein said ideal distribution comprises a distribution based on local differences in two similar consecutive frames wherein essentially no relative motion is detectable between the content depicted in the two similar consecutive frames.

* * * * *